July 17, 1923.
A. C. SANDERS
SHIELD
Filed Aug. 30, 1921
1,462,127
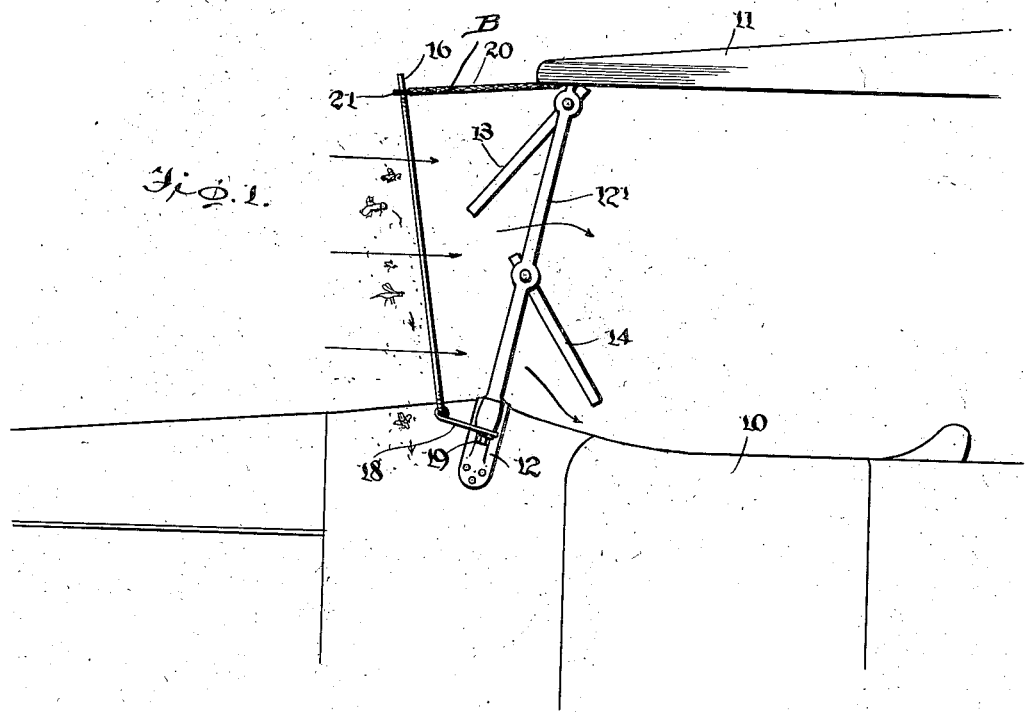
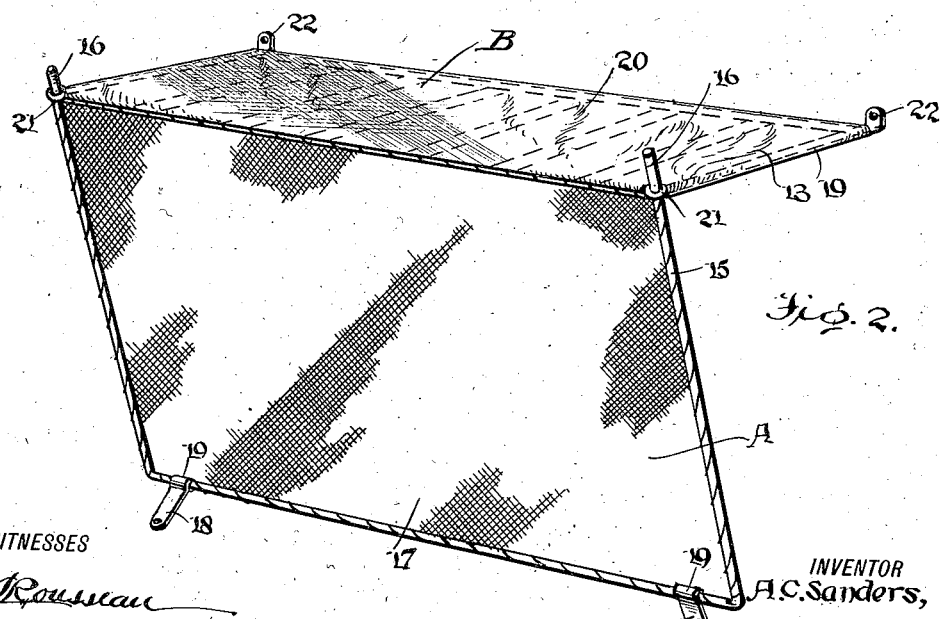
WITNESSES
INVENTOR
A.C.Sanders,
BY
ATTORNEYS Patented July 17, 1923.

1,462,127

UNITED STATES PATENT OFFICE.

ALBERT C. SANDERS, OF HELENA, ARKANSAS.

SHIELD.

Application filed August 30, 1921. Serial No. 496,810.

*To all whom it may concern:*

Be it known that I, ALBERT C. SANDERS, a citizen of the United States, and resident of Helena and county of Phillips and State of Arkansas, have invented certain new and useful Improvements in Shields, of which the following is a specification.

This invention relates to a combined ventilating and sun shield for automobiles or the like.

The object of the same is to provide a device of the above character adapted to be mounted or attached to any standard type of automobile, and to permit the free passage of air therethrough.

A further object of the invention is that the sun shield associated with the ventilating shield will serve efficiently to protect the driver or operator of the automobile from sun glare.

It is also an important object of the invention that the ventilator shield will be adapted to prohibit insects, bugs or other foreign elements in the atmosphere from passing therethrough.

It is also within the scope of the invention that the device be adapted to be mounted upon an automobile having a standard windshield without interfering with the operation of the same.

Other objects will more definitely appear in the detailed description following.

The invention is illustrated by way of example in the accompanying drawing in which:

Figure 1 is a partial side elevation of an automobile to which the present invention has been applied.

Figure 2 is a perspective view of the combined ventilating shield and sun shield.

Referring to the drawing more particularly the numeral 10 indicates generally the body of an automobile and 11 the top thereof. The body has the usual stops 12 secured thereto one on each side by which the windshield standards 12 are supported and between the standards there is pivoted in the usual manner an upper windshield 15 and a lower windshield 14.

In carrying out the present invention a ventilating shield is generally designated by the reference character A and a sun shield is designated by the reference character B. The ventilating shield comprises a frame 15 the side portions of which each have an extension as at 16 at the upper ends thereof, as shown. Within the frame 15 is disposed a reticulated shield 17 which may be of any material suitable for the purposes stated such as netting or screen. To the lower portion of the frame 15 is pivoted a pair of supporting elements 18 one adjacent each side thereof and preferably having their ends associated with the frame and turned about the lower portion thereof as indicated at 19. The inner ends or rear ends of the supporting elements 18 are formed with suitable openings so that they may be slid upon the lower ends of the windshield standard and by means of the nuts 19' be secured in position for supporting a ventilating shield A.

A second frame 19 is provided which is U-shaped and suitably supports therein a glare shield 20 which may be made of colored glass or other suitable material. The free ends of the U-shaped frame 19 are formed with a suitable eye as at 21 so that they may be secured to the projections 16 of the frame A. At each end of the bridge portion of the U-shaped frame 19 there projects a lug 22 which is formed with an opening as shown and by which this end of the frame may be secured to the upper end of the windshield standard or to the top of the automobile if so desired.

It is believed that the foregoing description and the advantages of the present invention may be clearly understood. The ventilating shield A permits free passage of air therethrough and also serves to protect the occupants of the automobile with which the same may be associated from insects, bugs or other foreign matter that may be in the atmosphere. The shield is positioned sufficiently forward to the regular windshield that it does not interfere with the operation thereof and also serves as means for supporting the sun glare shield 20 in an efficient manner for protecting the eyes of the driver of the automobile.

Having thus fully described my invention, what I claim is:—

1. A combined ventilator and sun shield for automobiles comprising a reticulated shield forward to the main windshield section of the automobile and extending forwardly toward its upper end, means for supporting the same and a sun glare shield of translucent material supported between the upper end of the reticulated shield and the top of the automobile.

2. In combination, a motor vehicle having a top, a reticulated sheeting supported forward to the driver's seat of the motor vehicle, and a sun reflecting sheeting extending between the upper end of the reticulated sheeting and the top of the motor vehicle.

3. An attachment for windshield standards of a motor vehicle, comprising a pair of link members adapted to be secured at their rear ends to the lower ends of said windshield standards and extend forwardly with relation to said standards, a frame enclosing a reticulated sheeting supported by the forward ends of said links and adapted to serve as a shield for said motor vehicle, and a sunshield secured between the upper ends of the windshield standards and the upper end of said reticulated shield.

4. An attachment for windshield standards of a motor vehicle, comprising a pair of link members adapted to be secured at their rear ends to the lower ends of said windshield standards and extend forwardly with relation to said standards, a frame enclosing a reticulated sheeting supported by the forward ends of said links and adapted to serve as a shield for said motor vehicle, and a frame enclosing a sheeting adapted to serve as a sunshield, said frame being interposed between the upper end of the frame carrying the reticulated shield and the upper end of the windshield standards, and means carried by said frame whereby the same may be detachably secured to the frame carrying the reticulated shield and to the windshield standards.

5. A wind shield attachment of the character described, comprising a frame supported forward to a wind shield, a reticulated sheeting supported by said frame, and a sun reflecting sheeting extending between the upper end of said frame and the upper end of said wind shield.

ALBERT C. SANDERS.